Figure 1:
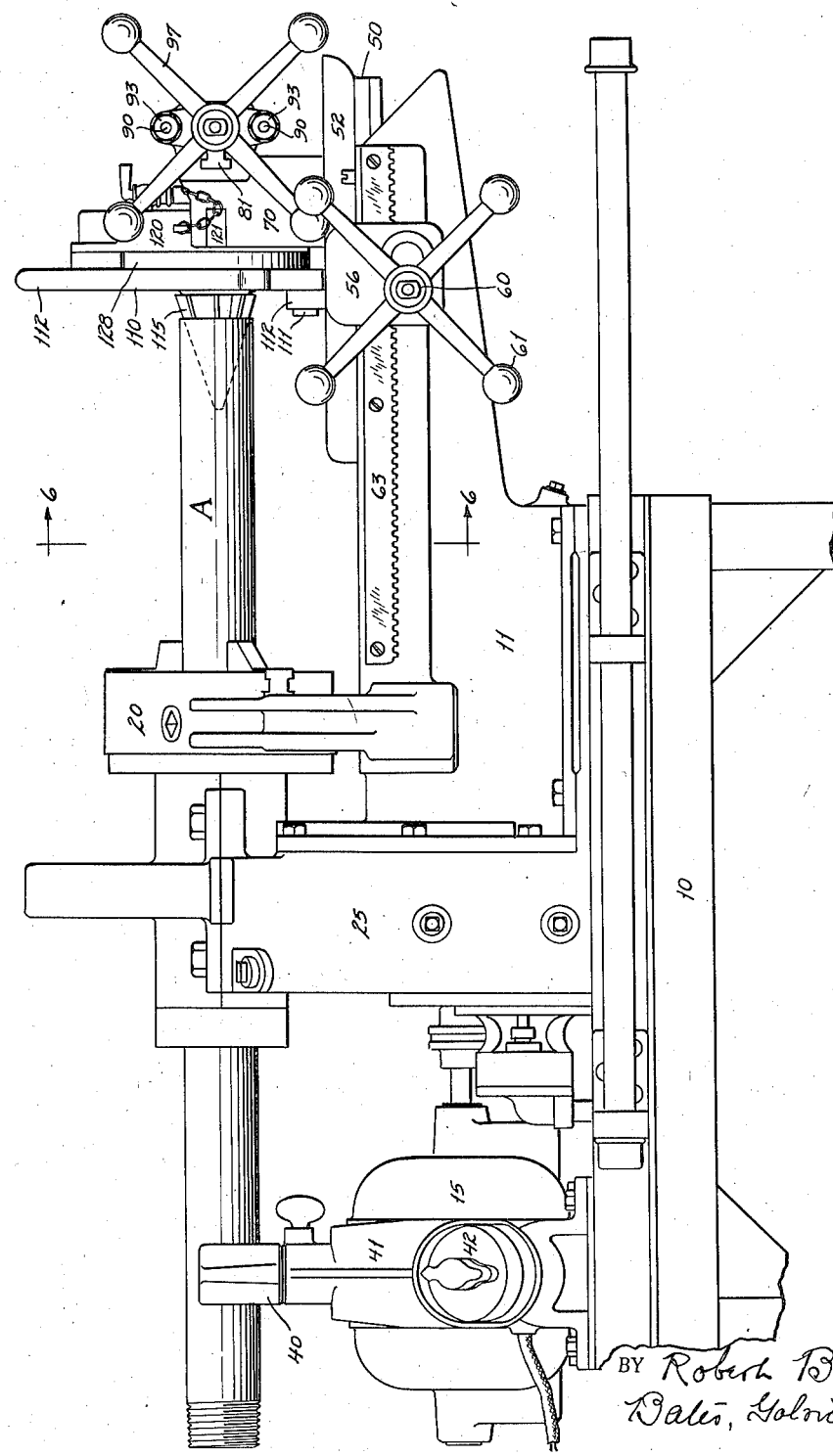

May 4, 1937. R. B. PEALER 2,079,179
PIPEWORKING MACHINE
Filed Dec. 26, 1935   4 Sheets-Sheet 1

INVENTOR.
BY Robert B. Pealer
Bates, Goldrick & Fears
ATTORNEYS.

May 4, 1937.  R. B. PEALER  2,079,179
PIPEWORKING MACHINE
Filed Dec. 26, 1935   4 Sheets-Sheet 3

INVENTOR.
BY Robert B. Pealer,
ATTORNEYS.

May 4, 1937.  R. B. PEALER  2,079,179
PIPEWORKING MACHINE
Filed Dec. 26, 1935  4 Sheets-Sheet 4

INVENTOR.
Robert B. Pealer,
BY
Bates Golrick Mears
ATTORNEYS.

Patented May 4, 1937

2,079,179

UNITED STATES PATENT OFFICE 2,079,179

PIPEWORKING MACHINE

Robert B. Pealer, Warren, Ohio, assignor to Beaver Pipe Tools, Inc., Warren, Ohio, a corporation of Ohio Application December 26, 1935, Serial No. 56,145

3 Claims. (Cl. 10—87)

This invention relates to a power machine for performing operations on pipes and is of the type where the pipe is mounted in a chuck rotated by power and the working tool is mounted on a slidable carriage. Such working tool may comprise a group of chasers to thread the pipe, a cutter to cut it off, or a reaming tool. Preferably, the carriage carries all of such tools, any or all of which may be used for action on the pipe without changing its position in the chuck.

My invention is in the nature of an improvement on the invention shown, described and claimed in my prior Patent 1,947,874, issued February 20, 1934, to my assignee The Borden Company, now named Beaver Pipe Tools, Inc. One of the objects of the present invention is to simplify and cheapen the construction of the carriage over that shown in such patent.

Another object of this invention is to provide a self-centering cutter having a rolling knife opposed by bearing rollers, which is accordingly cheaper and more readily adaptable for various sizes of pipe than the knife cutters shown in the patent mentioned.

Another object is to provide a reaming tool permanently carried by the carriage and adapted to be manually brought into engagement with the pipe whenever desired to ream out the internal fin which may be caused by the cutter. Still another object is to arrange the reamer so that it may be utilized to form a bevel on the exterior of the pipe.

My invention comprising the means by which I attain the above objects, or any of them, will be more apparent from the following detailed description of a preferred embodiment of the invention shown in the drawings hereof.

Figure 2:
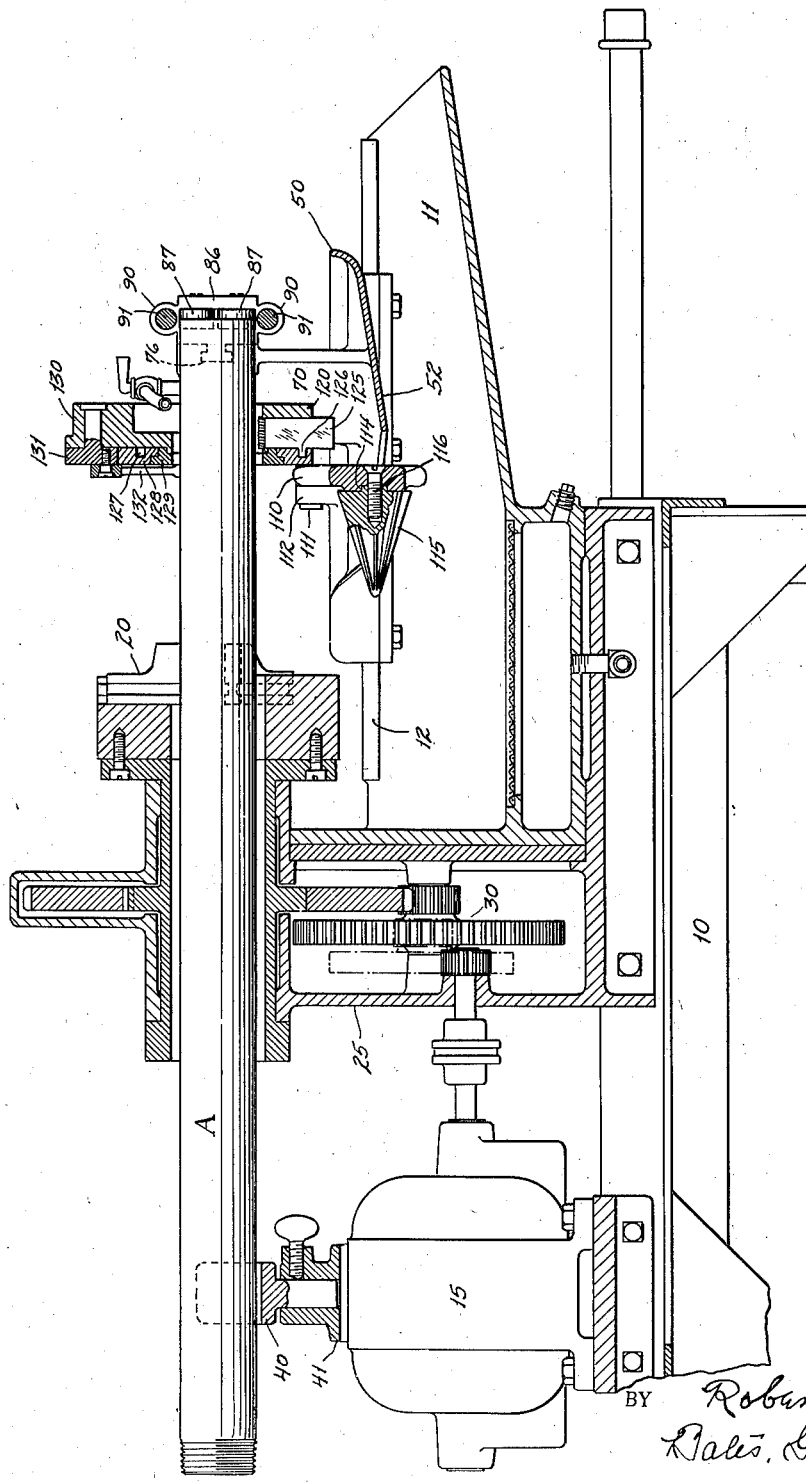
Figure 3:
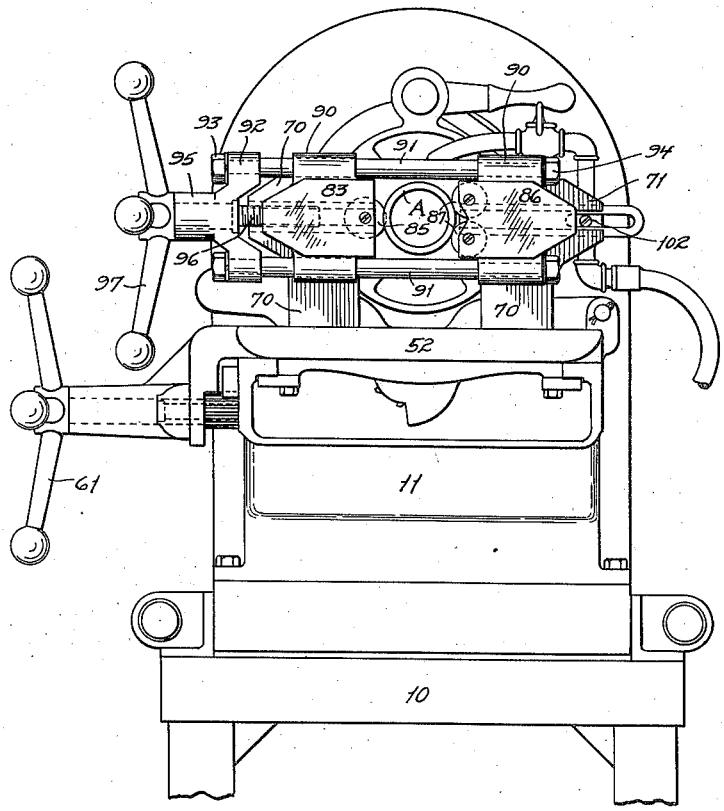
Figure 4:
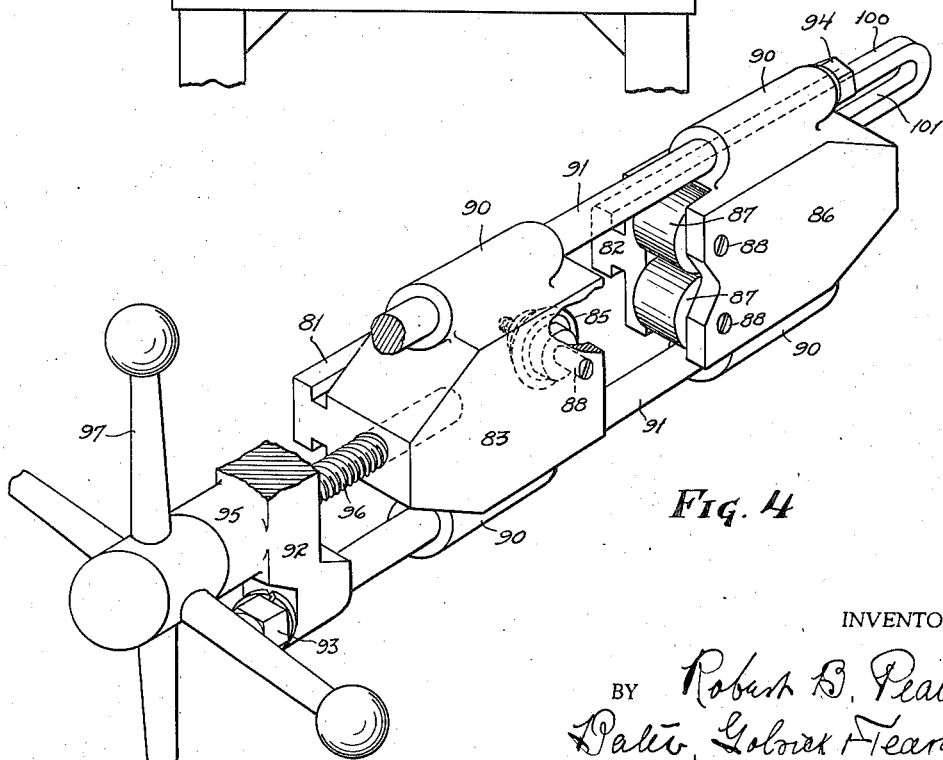
Figure 5:
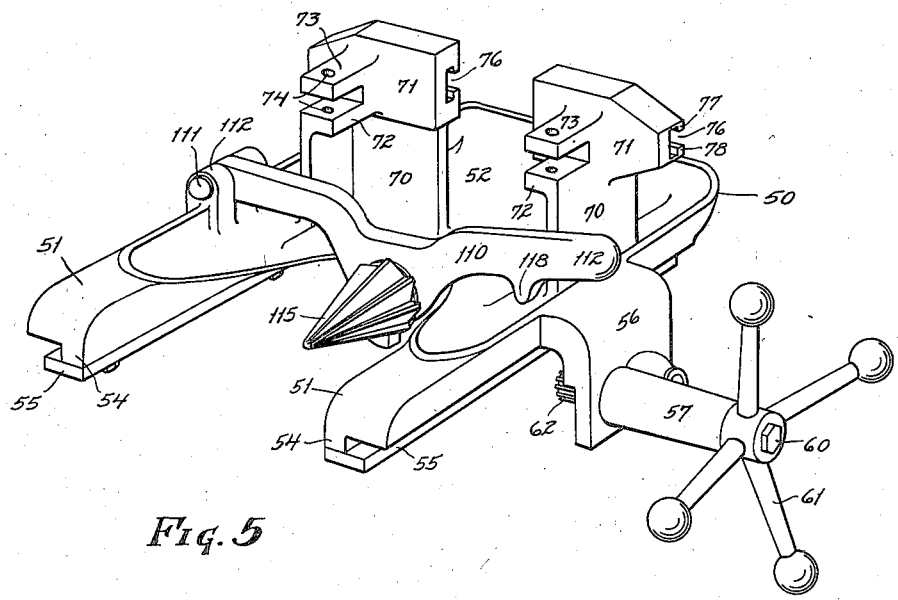
Figure 6:
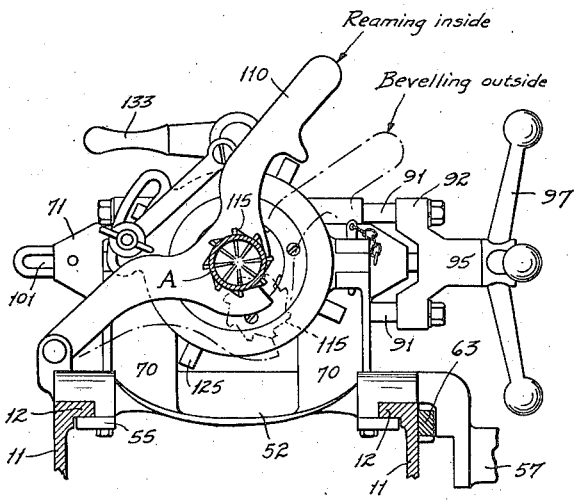
Figure 7:
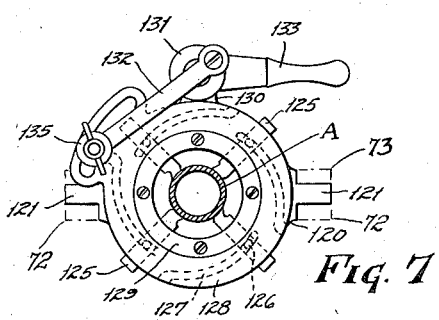

In the drawings, Fig. 1 is a side elevation of my complete pipe working tool; Fig. 2 is a vertical longitudinal section thereof; Fig. 3 is an end view; Fig. 4 is a perspective of the pipe cutting unit itself; Fig. 5 is a perspective of the carriage with the threading unit and the pipe cutting unit removed; Fig. 6 is a vertical section on the line 6—6 on Fig. 1 showing the carriage in end view; Fig. 7 is a face view of a pipe threading unit which is identical with that of the prior patent and may be employed on the carriage of this application.

Briefly, the entire machine shown in Figs. 1 and 2 may comprise a frame 10 carrying an overhanging bed 11; a driving motor 15 supported on the bed 10; a rotating chuck 20 mounted in a hollow standard 25 which houses reduction gearing 30 connecting the motor to the chuck, and a carriage 50 slidably mounted on the extension bed 11 and carrying the pipe-working tools.

The chuck 20 is of any suitable form adapted to clamp a pipe, illustrated at A in Figs. 1 and 2. The pipe is shown also as resting behind the chuck on a pipe rest 40 mounted on a standard 41 of inverted U-shape, which is secured to the bed and extends over the motor and carries the motor-controlling switch 42.

The extension frame 11 is an open trough-like member having a pair of inwardly projecting ledges 12 at the top of its side walls shown in Figs. 2 and 6. The carriage, shown in perspective in Fig. 5, is a casting approximately in the form of a horizontal U, thus providing two straight base portions 51 connected by a yoke portion 52. The base portions rest on the top of the extension frame 11 and are longitudinally rabbeted so that they extend down and along the inner faces of the ledges 12, as shown at 54. To the bottom of the portions 54, I bolt longitudinal strips 55, which underhang the ledges 12, thus slidably attaching the carriage to the extension bed, while enabling its removal if desired.

Extending forwardly and downwardly from the carriage frame is a bracket 56, which may be an integral part of the casting and which carries a forwardly extending tubular boss 57. Mounted in this boss is a shaft 60 to the outer end of which is secured a suitable hand-wheel 61; on the inner end of the shaft is a spur pinion 62 meshing with a downwardly facing stationary rack 63 formed on the front wall of the extension bed 11. This construction enables the carriage to be moved toward and from the chuck as desired.

The carriage 50 includes two upstanding posts or standards 70 having horizontally extending heads 71. These heads have on their faces toward the chuck suitable means for carrying the threading unit. As shown, this comprises horizontal web-like portions 72 and horizontal ears 73 above such web-like portions, aligned openings 74 being made through the web portions and ears. The threading unit may comprise a ring carrying radial chasers and having diametrically opposed horizontally extending perforated ears which occupy the ways between the webs 72 and the ears 73 of the carriage and may be locked thereto by vertical pins passing through the openings 74 of the carriage and the openings of the chaser ring ears.

The chaser ring may carry fixed chasers, there being a different ring for each size of pipe, or, if desired, the chasers may be adjustably mounted in the chaser carrying ring, as set out in my patent referred to and as illustrated herein in Fig. 7, and hereinafter described in detail.

The two post heads 71, on the opposite side from the chaser carrying ways, have horizontal ways in which the cutter frame is mounted; that is to say, on the head 71 at the top of each post 70 is a horizontal groove 76 restricted at the entrance by rib-like portions 77 and 78. The pipe threading unit shown in Fig. 4, and designated as a whole by the numeral 80, has T-shaped ribs 81 and 82 slidably occupying the guideway provided by the undercut grooves 76.

Describing the cutting unit more specifically, I provide a block 83 carrying the rib 81 and having an internal recess in which is mounted a pipe-cutting wheel 85, and a block 86 carrying the rib 82 and having a recess in which are mounted a pair of pipe bearing rollers 87. The rollers 87 and the wheel 85 are of standard construction for the usual hand pipe cutter, and are mounted in their respective recesses on pins as 88, which pass freely through one portion of the block and are threaded near their free ends to screw into the block at the other side of the recess in the usual manner.

Each of the blocks 83 and 86 is formed on its upper and under-surface with tubular extensions 90; occupying these extensions are horizontal rods 91, the forward ends of which pass also through a yoke 92. Nuts 93 and 94 are secured to the ends of the rods on the outer side of the yoke and the block 86, respectively. The yoke 92 has a tubular boss 95 in which is rotatably mounted a shaft 96 which has external threads engaging internal threads in the block 83. Mounted on the outer end of the shaft 96 is a hand-wheel 97. The block 83 is slidable on the rods 90, and, accordingly, when the hand wheel 97 is turned the blocks 83 and 86 are caused to approach each other or separate according to the direction of turning of the hand wheel, the blocks being freely slidable in the ways in the heads 71 of the carriage posts 70, so that irrespective of the size of the pipe, the cutting wheel and thrust rollers will bear against the pipe with equal pressure.

When no pipe is present, the whole cutting unit may be shifted back and forth and may have its opening enlarged or reduced by rotating the hand-wheel; then when the pipe is in place between the knife and bearing rollers, the turning of the hand-wheel to cause the engagement of the knife automatically centers the cutting tool, the rollers coming simultaneously into engagement with the other side of the pipe. As the pipe continues to rotate, the turning of the hand wheel 97 causes the cutter to bear more deeply into the pipe until it is cut off.

To prevent the shiftable cutting unit from being inadvertently disconnected from the carriage when no pipe is between the knife and rollers, I form the guiding portion 82 of the block 86 with an extension 100 having a slot 101. A stop block 102 secured by a screw to the base of the recess 76, in the head 71 of the carriage which carries the block 86, occupies the slot 101. This limits the sliding movement of the block 86 between the position suitable for the smallest pipe to be cut and that for the largest pipe, and thereby prevents the cutting unit being inadvertently disconnected from the carriage. However, whenever desired, the removal of the screw holding the block 102 enables the whole cutting unit to be removed.

The reaming unit comprises a lever 110 (Figs. 2 and 5) pivoted at 111 to ears 112 rising from the carriage, the lever extending across the carriage and terminating in a handle portion 112 in a convenient location back of the hand wheel 61. Bolted to the face of the lever, on the side toward the chuck, is a reaming cone 115 which has ratchet-like cutting ribs usual with pipe reamers. This cone is shown in Fig. 2 as having a parallel-sided boss 114 on its head occupying a correspondingly shaped recess in the lever 110, and is held in place by a screw bolt 116 passing through the lever into the cone. The lever normally rests in the position shown in Fig. 5, with the intermediate portion of the lever and the cone well below the region of the largest pipe, but with the handle 112 held sufficiently above the carriage frame by a lug 118 on the lever so that the handle may be readily grasped.

When it is desired to ream a pipe, as, for instance, to remove the interior fin formed by the cutting wheel, the carriage is moved by its hand wheel 61 until the reamer is beyond the end of the pipe, then the reamer lever is lifted into the position shown in full lines in Fig. 6, that is, in axial alignment with the pipe; then the carriage is returned to bring the reaming cone into the pipe, which, being rotated by the chuck, is effectively reamed.

In my machine the same reaming tool may be used to bevel the exterior of the pipe; that is to say, when the lever is in its normal position of rest as shown in Fig. 5, the carriage may be positioned so that an intermediate portion of the length of the reamer cone lies directly beneath the end of the pipe, and then the lever may be raised into such position as indicated in broken lines in Fig. 6, where the non-rotating cone engages the exterior of the rotating pipe and is thus effective to bevel the end thereof.

The boss 114 on the reamer cone has been described as parallel sided, and as occupying a similar recess in the lever, preventing the cone rotating. This construction, however, enables the cone to have two different positions interchangeably so that fresh ribs of the reamer may be brought into the region which is active for bevelling the pipe, if, after long use, such bevelling operates to dull the reaming tool. By making two slots in the lever at right angles to each other, or by making the boss square, the bevelling tool could take any of four active positions, if desired.

I have referred to the chaser carrying ring mounted on the carriage posts as being of a form which fixedly carries its chasers, or carries them adjustably so that the same ring and chasers may be suitable for pipes of different sizes. The adjustable form is illustrated in Fig. 7 hereof and includes a ring 120 having perforated ears 121 adapted to occupy the ways of the carriage between the webs 72 and ears 73. This ring has radial grooves occupied by chasers 125. These chasers have pins 126 occupying cam grooves 127 in a plate-like ring 128, rotatively mounted on the chaser carrying ring, being retained by a locking ring 129 secured to the relatively stationary ring 120. The chaser carrying ring 120 has an extension 130 on which is mounted a crank 131, connected by a link 132 to the cam plate 128. A lever 133 on the crank shaft may move the crank to throw the cam plate in one direction or the other. Ordinarily, one extreme position of the crank sets the chasers for one size of pipe, while the opposite extreme position sets them for the next size, which is to have the same pitch of thread.

The link 132 is shown as adjustably anchored to the cam plate by means of a wing nut 135 on a pin occupying a slot in the cam plate. The loosening of this nut enables the cam plate to be shifted to an abnormal position, bringing open ends of the cam grooves into registration with the chaser pins, so that the chasers may be drawn entirely out of the ring 120 and replaced by other chasers. This enables threads of different pitch to be cut as desired.

By the means described, the same chaser carrying ring unit is effective for two sizes of pipe by merely operating the hand lever 133. The construction could be arranged so that the same ring might be employed for more than two sizes of pipe by substituting chasers of different pitch, though I regard it as preferable to employ a different ring for each pair of sizes. If an unadjustable ring with fixed chasers is employed, there should be one ring for each size of pipe.

It will be understood from the description given that the entire carriage embodiment of the present invention is simple, and that the various tools carried by it enable the effective threading, cutting, reaming or bevelling of pipes of all sizes, within the range of the chuck, without changing the position of the pipe in the chuck. The cutting tool is self-centering and has a similar action on the pipe to that of an ordinary hand cutter with a wheel knife which has been found very satisfactory in practice. The simple reaming device shown is normally out of the way and does not obstruct any of the other operations, but is available whenever desired, both for internal reaming and external bevelling.

The herein disclosed and above described pipe-cutting arrangement per se has been made the subject of a divisional application, Serial No. 77,010, filed April 29, 1936, and the reaming and bevelling arrangement per se of application Serial No. 77,011 of even date.

I claim:

1. The combination of a frame, a rotatable chuck carried thereby, a movable carriage on the frame, a pair of posts rigidly supported by the carriage standing respectively in front of and behind the chuck axis sufficiently to allow the passage of the pipe between the standards, a ring carrying tools adapted to engage a pipe extending between the posts, and means for detachably mounting it on the two posts at opposite regions substantially diametrally of the ring.

2. The combination of a frame, a rotatable chuck carried thereby, a movable carriage on the frame, a pair of posts rigidly supported by the carriage standing respectively in front of and behind the chuck axis sufficiently to allow the passage of the pipe between the posts, a threading device and a cutting device both mounted on the posts, and at opposite regions relative to the chuck axis, one of said devices being on that face of the posts which is toward the chuck and the other device on the face of the posts which is away from the chuck.

3. The combination of a frame, a rotary chuck carried thereby, a slidable carriage on the frame, said carriage having a pair of upright posts on opposite sides of the chuck axis, transverse heads on said posts, each head having a horizontal guide-way on one side and projecting means on the other side, a pipe-cutting device which is freely slidably mounted in the horizontal guideways for centering with respect to the pipe, and a chaser-carrying ring removably but stationarily mounted on said projecting means.

ROBERT B. PEALER.